United States Patent [19]

Murray

[11] Patent Number: 4,542,007

[45] Date of Patent: Sep. 17, 1985

[54] METHOD FOR PRODUCTION OF CARBON BLACK AND START-UP THEREOF

[75] Inventor: Lawrence K. Murray, Bartlesville, Okla.

[73] Assignee: Phillips Petroleum Company, Bartlesville, Okla.

[21] Appl. No.: 633,694

[22] Filed: Jul. 23, 1984

[51] Int. Cl.$^4$ .......................... C01B 31/02; C09C 1/48
[52] U.S. Cl. ..................................... 423/450; 423/449
[58] Field of Search ............... 423/449, 450, 455, 456, 423/457

[56] References Cited

U.S. PATENT DOCUMENTS

| | | | |
|---|---|---|---|
| 3,369,870 | 2/1968 | Ganz et al. | 423/450 |
| 3,645,685 | 2/1972 | Crouch | 423/450 |
| 4,309,400 | 1/1982 | Murray | 423/450 |
| 4,368,162 | 1/1983 | Mills et al. | 423/450 |
| 4,372,936 | 2/1983 | Surovikin et al. | 423/449 |

Primary Examiner—Gregory A. Heller
Attorney, Agent, or Firm—C. F. Steininger

[57] ABSTRACT

In a method of producing carbon black in which a carbonaceous material is burned in the presence of a combustion supporting gas, burning is terminated, by the addition of a quench fluid, to produce hot combustion gas containing carbon black, heat values are recovered from the hot combustion gas, by passing the same in indirect heat exchange with water, the combustion supporting gas and/or a carbonaceous material (usually a liquid feed material), to produce a combustion gas of reduced temperature and part of the combustion gas of reduced temperature is utilized as the quench fluid startup is improved by using a normally gaseous carbonaceous material as a feed, withdrawing at least part of the hot combustion gas, usually after using the same to produce steam, utilizing the withdrawn hot combustion gas at the quench until the combustion gas of reduced temperature reaches a predetermined temperature, usually about 500° F., and then substituting a liquid carbonaceous material as at least part of the feed and substituting part of the combustion gas of reduced temperature for the withdrawn hot combustion gas.

27 Claims, 1 Drawing Figure

4,542,007

METHOD FOR PRODUCTION OF CARBON BLACK AND START-UP THEREOF

The present invention relates to a method of carbon black production. In another aspect, the present invention relates to a method for the start-up of carbon black production.

BACKGROUND OF THE INVENTION

Conventionally, carbon black is produced by burning a carbonaceous material in the presence of a combustion-supporting material in a highly specialized furnace or reactor, terminating the burning after a relatively short residence time by the addition of a quench fluid to produce a hot combustion gas containing carbon black, preferably recovering heat values from the hot combustion gas by passing the same in indirect heat exchange with water and/or one or more of the reactant materials to produce a combustion gas of reduced temperature, and recovering the carbon black from the combustion gas of reduced temperature.

In one mode of operation, water is utilized as a quench fluid to terminate the burning. This quench water together with water produced in the burning step creates serious corrosion problems in equipment for recovering heat values from the hot combustion gas, as well as in the system for recovering the carbon black from the combustion gas of reduced temperature. This problem is particularly significant during start-up of the carbon black process. Normally, during start-up, a fuel gas is burned in the presence of the combustion-supporting material and all equipment downstream of the reactor is operated as it would conventionally be operated for the production of carbon black for a period of time sufficient to attain carbon black production temperatures in the equipment throughout the system. Thereafter, the feed material is substituted for part or all of the fuel gas and carbon black is recovered under production conditions. This line-out or start-up of the system is a rather lengthy procedure and the water utilized as a quench fluid as well, as that produced during the burning step, will condense on the metal parts of the equipment downstream of the reactor until the equipment reaches a temperature above the dew point of water and, of course, severe corrosion occurs.

In order to eliminate the problem of corrosion created by the use of water as a quench fluid and the additional equipment necessary for the utilization of water as a quench fluid, an alternative method is to withdraw a part of the combustion gas of reduced temperature after the recovery of heat values therefrom and before the introduction thereof to the carbon black recovery equipment, and utilize this combustion gas of reduced temperature as the quench fluid. While this procedure eliminates a substantial portion of the corrosion problem, there is still sufficient water in the hot combustion gas from the reactor to cause corrosion problems. In addition, one or more blowers must be utilized to recycle the combustion gas of reduced temperature to the reactor, as a quench. This adds additional equipment which will be subject to corrosion. Start-up by this method is also a lengthy proposition, requiring about one and one-half hours. Further, since the combustion gas of reduced temperature, normally utilized as a quench fluid during carbon black production, is substantially below operating temperature during this start-up period, it is conventional practice to utilize water as a quench fluid during the start-up period and, thereafter, substitute the combustion gas of reduced temperature. Finally, the blowers utilized to recycle the combustion gas of reduced temperature, as a quench fluid, are designed to operate at a predetermined temperature, which of course is the temperature of the combustion gas of reduced temperature during the production of carbon black. Therefore, these blowers must be operated at the pre-determined temperature in order to eliminate maintenance problems. For this reason also, water is utilized as the quench fluid during start-up until the recycle combustion gas to be utilized as a quench fluid reaches the predetermined temperature.

SUMMARY OF THE INVENTION

It is therefore an object of the present invention to provide an improved method for carbon black production which overcomes the above and other problems of the prior art. A further object of the present invention is to provide a method for carbon black production which reduces the time necessary for the start-up of production. Another object of the present invention is to provide an improved method for carbon black production which reduces corrosion in equipment utilized in the method. Yet another object of the present method for carbon black production which reduces corrosion in equipment for the recovery of heat values from hot combustion gas from the reactor. A further object of the present invention is to provide an improved method for carbon black production which reduces corrosion in equipment for the recovery of carbon black. Another and further object of the present invention is to provide an improved method for carbon black production utilizing part of the combustion gas from the carbon black reactor as a quench fluid in the reactor. A still further object of the present invention is to provide an improved method for carbon black production utilizing a part of the combustion gas from the carbon black reactor as a quench medium in the reactor in which maintenance of blowers utilized to recycle the combustion gas is significantly reduced. Another object of the present invention is to provide an improved method for carbon black production utilizing part of the hot combustion gas as a quench fluid wherein corrosion of the blowers utilized to circulate such hot combustion gas is reduced. A still further object of the present invention is to provide an improved method for carbon black production utilizing a part of the hot combustion gas as a quench fluid, wherein the horsepower requirements of the blowers utilized to circulate such hot combustion gas is reduced. Yet another object of the present invention is to provide an improved method for carbon black production wherein the utilization of water in the process is reduced. A further object of the present invention is to provide an improved method for carbon black production wherein the production of steam for in-plant and other uses is significantly increased. Another object of the present invention is to provide an improved method for carbon black production wherein the off gas has sufficient heat values to be utilized as a fuel alone or in combination with an auxiliary fuel. Another and further object of the present invention is to provide an improved method for carbon black production in which off gas has sufficient heat values to be utilized as a fuel alone or in combination with an auxiliary fuel and such off gas can be utilized earlier in the process. Yet another object of the present invention is to provide an improved method for start-up of a carbon black production process in accordance with any or all of the previous objects.

In accordance with the present invention, a method for the manufacture of carbon black is provided in which a carbonaceous material is burned in the presence of a combustion-supporting gas, burning is terminated by the addition of a quench fluid to produce a hot combustion gas containing carbon black, heat values are recovered from the hot combustion gas by passing the same in indirect heat exchange with water, the combustion supporting gas and/or carbonaceous material to produce a combustion gas at a reduced temperature, a part of the combustion gas, at reduced temperature, is recycled to the carbon black reactor as a quench fluid and carbon black is recovered from the remainder of the combustion gas of reduced temperature. Start-up of the process is substantially improved by withdrawing at least part of the hot combustion gas prior to the utilization of the same in indirect heat exchange with water, the combustion-supporting gas and/or the carbonaceous material and the thus withdrawn hot combustion gas is utilized as a quench fluid until the combustion gas of reduced temperature reaches a predetermined reduced temperature. Preferably, a fuel gas is utilized as a carbonaceous material during start-up and upon completion of start-up, a liquid carbonaceous material is substituted for at least part of the fuel gas, the withdrawn hot combustion gas is discontinued as a quench fluid and the combustion gas of reduced temperature, at a predetermined reduced temperature, is utilized as a quench fluid. In another preferred embodiment, the carbonaceous material feed is preheated independently rather than by indirect heat exchange with hot combustion gas.

BRIEF DESCRIPTION OF THE DRAWING

The single FIGURE of the drawings is a simplified flow diagram showing a carbon black production system utilizing the method of the present invention.

DESCRIPTION OF THE PREFERRED EMBODIMENTS

Figure 1:
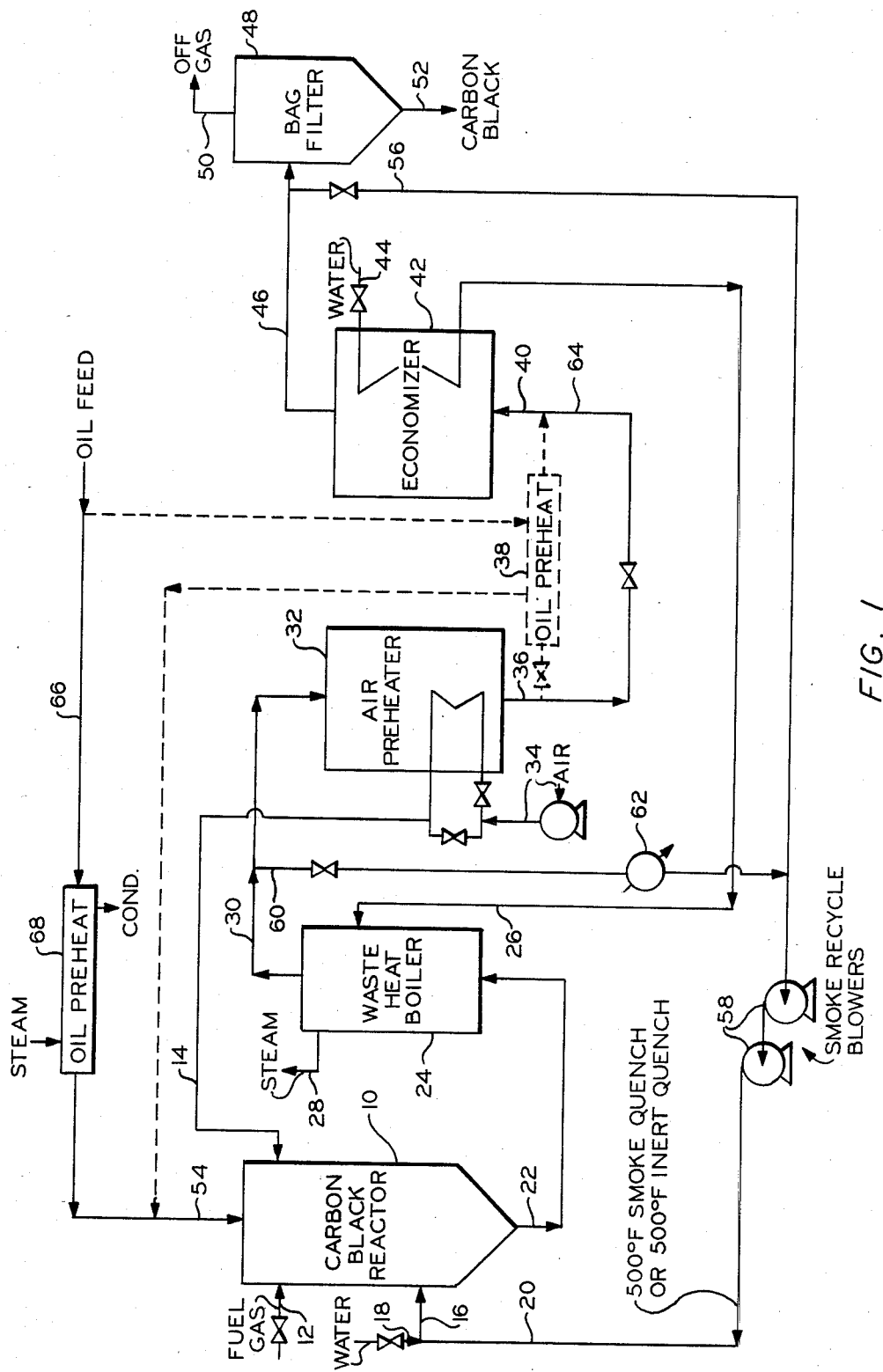

When utilized in the present application, the term "carbonaceous material" is meant to include normally gaseous carbonaceous materials, such as natural gas, normally liquid carbonaceous materials, such as normally liquid fractions of petroleum, shale oils, oils derived from coal, lignite and the like, etc. and normally solid carbonaceous materials, such as powdered coals, lignite, etc.

The term "combustion-supporting material", when utilized herein is meant to include any oxygen-containing material capable of supporting combustion, including oxygen, oxygen-enriched air, air and the like.

Carbon black may be produced from any carbonaceous material having sufficient carbon atoms for the production of practical quantities of carbon black. In general, the higher the carbon to hydrogen ratio of the feed material, the more desirable the carbonaceous material for carbon black production. While normally gaseous carbonaceous materials, particularly natural gas, have been utilized to produce carbon black and considerable research has been conducted for the production of carbon black from normally solid carbonaceous materials, such as coal and lignite, the most conventionally utilized carbonaceous materials are heavy fractions derived from petroleum. These materials are most often utilized because of their higher carbon to hydrogen ratio than natural gas and the greater ease of transport through the reactor and component break down, as compared with coal, lignite and the like. However, during start-up of a carbon black process, it is the usual practice to employ a normally gaseous carbonaceous material, particularly natural gas, as a fuel gas because of its higher heating value and, thus, its ability to more rapidly bring the system up to operating temperatures. Once the system has been lined out with natural gas as a fuel gas, conventional practice is to then substitute normally liquid hydrocarbons for all or a part of the natural gas for carbon black production. A preferred technique involves utilizing natural gas for start-up and, thereafter, substituting liquid hydrocarbons for part of the natural gas for carbon black production.

For obvious reasons, air is the usual combustion-supporting gas utilized.

A number of highly sophisticated and efficient reactors are known to those skilled in the art. These reactors differ from one another primarily in the manner of introducing the carbonaceous material and the combustion-supporting gas.

The residence time of the feed carbonaceous material and combustion-supporting gas in the reactor will of course depend upon the character of the carbonaceous material utilized but the optimum residence times are well known to or can be readily determined by one skilled in the art. After combustion for a residence time which produces optimum quantities of carbon black, the combustion is terminated by the addition of a quench fluid as previously discussed in the introductory portion hereof. Usually, quench fluid is introduced radially into the flame front from a plurality of points around the periphery of the reactor. While the temperature of combustion within the reactor is generally in the neighborhood of about 2,400° to 2,700° F., the effluent from the reactor is quenched to a temperature below about 2,000° F., generally in the neighborhood of 1,800° F.

With this background in mind, the present invention and its advantages will be best understood by the following description read in conjunction with the single FIGURE of drawings.

The detailed description with reference to the drawing will be described with reference to a specific example utilizing a reactor operating at a heating rate of 24.31 MM Btu/hr.

Accordingly, during start-up, 24.31 MSCS/hr. of fuel gas, specifically, a natural gas having a heating value of about 1,000 Btu/SCF, was introduced into reactor 10 through line 12. The specific mode of introduction comprised the tangential injection of the gas from a plurality of points about the periphery of the reactor. The combustion-supporting gas introduced through line 14 was air, at a rate of 483.6 MSCF/hr. This air was preheated and also introduced into reactor 10 tangentially.

Combustion is terminated in reactor 10 by the introduction of quench fluid through line 16. In accordance with conventional practice, during start-up of the process, the quench fluid is water introduced through line 18, for example, at a temperature of about 90° F. and at a rate of about 3,629 Lbs./hr. However, in accordance with the present invention, the quench fluid during start-up is the herinafter described withdrawn hot combustion gas, at a temperature of about 500° F., which is introduced through line 20. The quenched, hot combustion gas, sometimes referred to as smoke or reactor effluent, discharged from reactor 10 through line 22 was at a temperature of 1705° F.

For most efficient operation, heat values are recovered from the hot combustion gas and generally utilized as a source of energy within the carbon black system itself, although, in some cases, excess energy may be utilized for other purposes. Specifically, the hot combustion gas from line 22 is utilized to generate steam in waste heat boiler 24. Accordingly, the hot combustion gas is passed in indirect heat exchange with the hereinafter described hot water introduced through line 26. In waste heat boiler 24, the hot water is converted to steam, which can be utilized in the plant itself, as hereinafter described, or for other general plant purposes. For simplification, however, the steam is shown as being discharged through line 28. Hot combustion gas, after passage through waste heat boiler 24 is discharged through line 30, and in the specific example, at a temperature of 594° F. The hot combustion gas passing through line 30 is then passed to air preheater 32. In air preheater 32, the hot combustion gas is passed in indirect heat exchange with air, introduced through line 34, which then becomes the preheated air passing through line 14 to the reactor. In the specific example, the air was preheated to a temperature of 438° F. The hot combustion gas, after passing through air preheater 32 is discharged through line 36. At this point, the hot combustion gas was at a temperature of 388° F. In accordance with conventional practice and one alternative in accordance with the present invention, the hot combustion gas is then passed through oil preheater 38. No oil is introduced to reactor 10 during start-up of the process and, accordingly, there is no necessity for preheating the oil at this time. However, where the alternative procedure of utilizing hot combustion gas to preheat the oil is carried out, in accordance with the present invention, it is preferable to operate oil preheater 38 and in some way bypass the reactor, for example, by discharging the preheated oil into a surge tank or the like. The hot combustion gas from oil preheater 38 passes through line 40 and, in the specific example, was at a temperature of about 332° F. The hot combustion gas from line 40 is then passed through economizer 42 where it is passed in indirect heat exchange with water introduced through line 44. The water, thus heated in economizer 42, is then passed through line 26 as the hot water to waste heat boiler 24. The combustion gas of reduced temperature is then discharged through line 46 and thence to the carbon black recovery system here illustrated as bag filter system 48. The recovery system may, however, be a combination of a bag filter system preceded by a series of cyclone separators. Off gas from bag filter 48 is discharged through line 50 while the recovered carbon black is discharged through line 52. The combustion gas of reduced temperature, passing through line 46 to bag filter 48, is preferably at a predetermined temperature of about 500° F. This temperature is considered optimal, since it is above the temperature at which condensation of water in the bag filter system will occur and hence corrosion will result but below a temperature at which the bag material in the bag filter system will be damaged by heat.

Obviously the passage of the hot combustion gas from line 22 through waste heat boiler 24, air preheater 32, oil preheater 38 and economizer 42 is designed to recover as much of the heat values as possible from the combustion gas, while at the same time reducing the temperature of the combustion gas to the predetermined temperature of the gas passed to bag filter 48. Consequently, various arrangements of the indirect heat exchangers may be adopted. However, the preferred sequence is that shown in the drawing and previously described.

Once the system has been brought up to operating temperatures and pressures, including preheating of the bag filter system 48 and particularly attaining the predetermined temperature and pressure of the combustion gas of reduced temperature passing through line 36, the start-up procedure is complete and carbon black production can be begun. At this point, preheated oil is introduced to reactor 10 through line 54. While, as previously indicated, fuel gas can be discontinued at this point and oil substituted for all of the fuel gas, the preferred technique is to substitute oil for only a part of the fuel gas for example, about half of the fuel gas. In addition, conventional quenching, by water introduced through line 18, is discontinued and quenching by a part of the combustion gas of reduced temperature passing through line 46 is initiated by withdrawing a part of the combustion gas of reduced temperature through line 56, passing the same through recycle blowers 58 and thence through line 20 and line 16 to reactor 10. The utilization of the combustion gas of a reduced temperature as a quench fluid during carbon black production reduces corrosion in the system and reduces the amount of water vapor in the off gas discharged through line 50. Hence, the off gas may be utilized as a low heat capacity fuel gas alone or in combination with an auxiliary fuel. Accordingly, additional energy is recovered from the system for use within the carbon black production system or other plant uses.

This recycle of part of the combustion gas of reduced temperature as a quench fluid creates problems of its own, as previously pointed out. Specifically, recycle blowers 58 are designed and calibrated to operate at the temperature of the combustion gas of reduced temperature in line 46 and the pressure of this gas stream. Accordingly, during start-up with the blowers operating on a gas having a temperature below the design temperature, and particularly where water is utilized as a quench fluid, serious corrosion will occur. In addition, other maintenance problems will be created by operating at a temperature lower than the temperature at which the blowers are calibrated. In order to overcome the above-mentioned problems of corrosion of the blowers 58 and maintenance problems thereof, neither water through line 18 nor combustion gas of reduced temperature from line 46 is utilized as a quench fluid during start-up. Instead, at least a part of the hot combustion gas passing through line 30 is withdrawn through line 60. This point of withdrawal is selected on the basis that the hot combustion gas passing through line 30 is near the predetermined temperature of 500° F. for which the blowers 58 are designed and calibrated. Any other point of withdrawal may of course be selected so long as the withdrawn hot combustion gas has a temperature of at least about 500° F. In the specific example, the hot combustion gas through line 30 was 594° F. Therefore, in order to reduce the temperature to the predetermined temperature of 500° F., the withdrawn hot combustion gas is passed through a cooler 62. The hot combustion gas at the predetermined temperature is then passed through blowers 58 and lines 20 and 16 and utilized as a quench fluid during the start-up period. This utilization of the hot combustion gas withdrawn through line 60 at the predetermined temperature and a higher pressure results in the numerous advantages previously mentioned. The most significant advantage is that the start-up time can be reduced to about fifteen minutes as compared with the one and one-half hours or longer necessary when operating conventionally, as previously described. The water requirements of the system are, of course, also reduced, since no water quench is utilized during start-up. The The table which follows illustrates pertinent flow and temperature data for three start-up runs and a continuous run of twenty one hours for making carbon black. The start-up data designated as start-up "A" refers to the specific example discussed in describing the drawing. In the Runs set forth in the Table, the oil preheater was heated by combustion gas, rather than independently by steam.

TABLE

| Unit or Stream and Drawing No. | Startup A | Startup B | Startup C | Continuous Run Making Black | | | | |
|---|---|---|---|---|---|---|---|---|
| | | | | 0.0 hr. | 4.0 hr. | 6.5 hr. | 18.5 hr. | 21.0 hr. |
| Fuel Gas: | | | | | | | | |
| MSCFH (12) | 24.31 | — | — | 14.27 | 10.57 | 10.57 | 10.57 | 10.57 |
| Process Air: | | | | | | | | |
| MSCFH (34 & 14) | 483.6 | — | — | 429.8 | 448.8 | 546.5 | 464.5 | 447 |
| °F. (34) | 170 | — | — | 176 | 171 | 164 | 174 | 180 |
| °F. (14) | 438 | 450 | 396 | 796 | 804 | 803 | 907 | 908 |
| Combustion Gas: | | | | | | | | |
| °F. (22) | 1705 | 1853 | 1940 | 1876 | 1853 | 1721 | 1815 | 1817 |
| °F. (30 & 60) | 594 | 553 | 572 | 1152 | 811 | 952 | 1158 | 1163 |
| °F. (20) | 500 | 500 | 500 | 615 | 661 | 659 | 674 | 674 |
| °F. (36) | 388 | — | — | 882 | 947 | 935 | 884 | 890 |
| °F. (40) | 332 | — | — | 623 | 703 | 708 | 646 | 652 |
| °F. (46 & 56) | 187 | — | — | 475 | 569 | 573 | 530 | 532 |
| Oil Feed: | | | | | | | | |
| GPH (54) | — | — | — | 940 | 905 | 1100 | 930 | 930 |
| °F. (54) | — | — | — | 514 | 522 | 556 | 509 | 513 |
| Recycle Combustion Gas: | | | | | | | | |
| MSCFH (56 & 20) | — | — | — | — | 195 | 195 | 195 | 135 | reduced time of start-up also reduces the possibility of corrosion by the presence of water in the system at low temperatures. Maintenance of the blowers 58 is also considerably reduced. Since water is not utilized as a quench during start-up, the off gas from line 50 may be utilized as a fuel much sooner. In the specific example, the gas of reduced pressure passing through line 46 was 175° F. Therefore, the problems created by recycling this gas through line 56 as a quench fluid during start-up are obvious. Since the gas through line 60 is also at a higher pressure than that through line 46, the horsepower requirement of the blowers 58 is also reduced significantly.

As soon as the system has been lined out and the temperature of the gas of reduced temperature, passing through line 46, reaches the predetermined temperature, the start-up procedure can be discontinued and carbon black production can be initiated. At this point, withdrawal of hot combustion gas through line 60 is discontinued and withdrawal of part of the combustion gas of reduced temperature through line 56 can be initiated, with the latter then serving as the quench fluid in reactor 10. Additionally, oil feed is passed through line 54 and substituted for at least part of the fuel gas being introduced through line 12.

In accordance with another embodiment of the present invention, the oil preheater may be bypassed by passing the hot combustion gas from air preheater 32 to economizer 42 through bypass line 64. Since the hot combustion gas to the economizer 42 is hotter than the other alternative, more water may be heated in economizer 42, waste heat boiler 24 can be enlarged and, accordingly, significantly larger amounts of steam can be produced. In this embodiment, the oil feed would therefore be fed through line 66 and preheated in preheater 68. Preheater 68 would, in turn, be heated by a part of the steam produced by the waste heat boiler.

It is obvious that the conditions of operation will vary, depending upon equipment size and condition of the equipment. For example, the temperatures of the effluent from the waste heat boiler will vary with the degree of carbon black fouling of the boiler tubes. It was also found that when the combustion gas was not being utilized to preheat the oil, as in oil preheater 38, it was necessary to reduce the temperature of the reactor effluent about 250° F. in order to prevent overheating of the bag filters. It was also observed, when operating during the start-up with feed gas only, approximately the same amount of steam can be produced by the waste heat boiler as when oil feed is being utilized to make carbon black even though the temperature drops in the neighborhood of about 1150° F. to about 500° F. This is due to the low mass flow to the waste heat boiler and the high heat transfer coefficient when fuel gas only is being burned.

As a general proposition, the temperature of the combustion gas from the reactor is preferably between about 1800° and 2000° F. As previously indicated, this temperature should be lowered about 250° if the combustion gas is not utilized to preheat the oil. The temperature of the combustion gas from the waste heat boiler should be between about 500° F. and 1200° F., the 500° representing the minimum temperature of operation during start-up with fuel gas only whereas the upper temperature is the approximate maximum when running to make carbon black.

If the combustion gas is not utilized to preheat the oil, the temperature of the combustion gas from the air preheater to the economizer should be between about 400° and 900° F. The temperature of the combustion gas of reduced temperature passing from the economizer to the bag filters should not exceed about 500° F. and may vary anywhere from about 150° to 300° F. (when fuel gas only is utilized) and about 300° to 450° F. during the production of carbon black with oil feed. The recycle combustion gas of reduced temperature to the recycle blowers should, of course, be as close to the calibrated temperature of the blowers (500° F.) as possible.

While specific examples, items of equipment and modes of operation are set forth herein, it is to be understood that these specifics are for purposes of illustration and to set forth the best mode in accordance with the present invention and are not to be considered limiting.

That which is claimed:

1. In a method for the manufacture of carbon black, wherein the combustion cycle, includes: sequentially, burning a carbonaceous material in the presence of a combustion-supporting gas under conditions to produce a hot, first, high temperature combustion effluent containing said carbon black; quenching said burning step, by introducing a quench fluid into said high temperature combustion, to produce a hot, second, high temperature combustion effluent; cooling said second, high temperature combustion effluent in at least two, indirect heat exchange steps, including at least two of:

(1) passing said second, high temperature combustion effluent in indirect heat exchange with water, to produce steam;
   (2) passing said second, high temperature combustion effluent in indirect heat exchange with said combustion-supporting gas, to preheat said combustion-supporting gas;
   (3) passing said second, high temperature combustion effluent in indirect heat exchange with a carbonaceous material, to preheat said carbonaceous material; and,
   (4) passing said second high temperature combustion effluent in indirect heat exchange with water, to heat said water, to produce a hot, intermediate temperature combustion effluent between the first and the last of said heat exchange steps and a hot, low temperature combustion effluent downstream of said last of said heat exchange steps; withdrawing a part of said low temperature combustion effluent from a point downstream of said last of said heat exchange steps; recycling the thus withdrawn part of said low temperature combustion effluent to said recycling step, as said quench fluid; and recovering said carbon black from the remainder of said low temperature combustion effluent, the improved method of starting up said production cycle, for the manufacture of carbon black comprising:
   (a) withdrawing at least a part of said intermediate temperature combustion effluent, from a point between said first and said last of said heat exchange steps and upstream of the point at which said part of said low temperature combustion effluent is to be withdrawn during said production cycle;
   (b) recycling the thus withdrawn intermediate temperature combustion effluent to said quenching step, as said quench fluid; and,
   (c) beginning said production cycle, including, discontinuing said recycling of said intermediate temperature combustion effluent and substituting said recycling of said low temperature combustion effluent, when the temperature of said low temperature combustion effluent reaches a temperature near a predetermined quench temperature.

2. A method in accordance with claim 1 wherein the carbonaceous material which is burned during the production cycle is one of (1) the same carbonaceous material burned during the start-up method, (2) a mixture of the same carbonaceous material burned during said start-up method and a different carbonaceous material and (3) a different carbonaceous material.

3. A method in accordance with claim 2 wherein the carbonaceous material burned during the start-up method is a normally gaseous carbonaceous material.

4. A method in accordance with claim 3 wherein the carbonaceous material burned during a production cycle is a mixture of the same carbonaceous material burned during the start-up method and a different carbonaceous material.

5. A method in accordance with claim 4 wherein the different carbonaceous material is a liquid carbonaceous material.

6. A method in accordance with claim 2 wherein the carbonaceous material burned during the production cycle is a different carbonaceous material than the carbonaceous burned during the start-up method.

7. A method in accordance with claim 6 wherein the different carbonaceous material is a liquid carbonaceous material.

8. A method in accordance with claim 1 wherein the thus withdrawn intermediate temperature combustion effluent is withdrawn between a temperature of about 150° F. and a temperature substantially below the temperature of the second, high temperature combustion effluent.

9. A method in accordance with claim 8 wherein the thus withdrawn intermediate temperature combustion effluent is at a temperature significantly higher than the predetermined quench temperature and said withdrawn intermediate temperature combustion effluent is cooled to about said predetermined quench temperature prior to introducing the same into the first, high temperature combustion effluent as the quench fluid.

10. A method in accordance with claim 1 wherein the predetermined quench temperature is about 500° F.

11. A method in accordance with claim 1 wherein the second high temperature combustion effluent is passed in indirect heat exchange with water, to produce steam and the intermediate temperature combustion effluent thus withdrawn is withdrawn downstream of said heat exchange with said water.

12. A method in accordance with claim 1 wherein the second, high temperature combustion effluent is sequentially passed in indirect heat exchange with water, to produce steam, and the combustion-supporting gas and the thus withdrawn intermediate temperature combustion effluent is withdrawn between said heat exchange with said water and said heat exchange with said combustion-supporting gas.

13. A method in accordance with claim 1 wherein the second, high temperature combustion effluent is sequentially passed in indirect heat exchange with the hereinafter-mentioned hot water, to produce steam, the combustion-supporting gas and water to produce said hot water, and the thus withdrawn intermediate temperature combustion effluent is withdrawn between said heat exchange with hot water to produce steam, and said heat exchange with said combustion-supporting gas.

14. A method in accordance with claim 1 wherein the high temperature combustion effluent is sequentially passed in indirect heat exchange with the hereinafter-mentioned hot water, the combustion-supporting gas, a carbonaceous material and water to produce said hot water and the thus withdrawn intermediate temperature combustion effluent is withdrawn between said heat exchange with said hot water and said heat exchange with said combustion-supporting gas.

15. A method for manufacture of carbon black, comprising:
(a) burning a carbonaceous material in the presence of a combustion-supporting gas under conditions to produce a hot, first high temperature combustion effluent;
(b) quenching said burning step, by introducing a quench fluid into said first, high temperature combustion effluent;
(c) cooling said second, high temperature combustion effluent by passing said second, high temperature combustion effluent through at least two indirect heat exchange steps, including at least two of:
(1) passing said second, high temperature combustion effluent in indirect heat exchange with water, to produce steam;
(2) passing said second high temperature combustion effluent in indirect heat exchange with said combustion-supporting gas, to preheat said combustion supporting gas;
(3) passing said second high temperature combustion effluent in indirect heat exchange with a carbonaceous material, to preheat said carbonaceous material; and
(4) passing said second, high temperature combustion effluent in indirect heat exchange with water, to heat said water, to produce a hot, intermediate temperature combustion effluent between the first and the last of said heat exchange steps and a hot, low temperature combustion effluent downstream of said last of said heat exchange steps;
(d) withdrawing at least part of said intermediate temperature combustion effluent from a point between said first and said last of said heat exchange steps and upstream of the points at which the hereinafter-mentioned part of said low temperature combustion fluid is withdrawn;
(e) recycling the thus withdrawn intermediate temperature combustion effluent to said quenching step, as said quench fluid; and,
(f) when the temperature of said low temperature combustion effluent reaches a temperature near a predetermined quench temperature, continuing said burning step, utilizing one of:
(1) said carbonaceous material of step (a),
(2) a mixture of said carbonaceous material of step (a) and a different carbonaceous material, and
(3) a different carbonaceous material to produce a hot, first high temperature combustion effluent containing said carbon black; discontinuing said recycling of said intermediate temperature combustion effluent, beginning to withdraw a part of said low temperature combustion effluent from a point downstream of said last of said heat exchange steps and to recycle the thus withdrawn part of said low temperature combustion effluent to said quenching step, as the quench fluid, at about said predetermined quench temperature, continuing said heat exchange steps and recovering said carbon black from the remainder of said low temperature combustion effluent.

16. A method in accordance with claim 15 wherein the carbonaceous material burned in step (a) is a normally gaseous carbonaceous material.

17. A method in accordance with claim 16 wherein the carbonaceous material burned in step (f) is a mixture of the same carbonaceous material burned in step (a) and a different carbonaceous material.

18. A method in accordance with claim 17 wherein the different carbonaceous material is a liquid carbonaceous material.

19. A method in accordance with claim 16 wherein the carbonaceous material burned in step (f) is a different carbonaceous material than the carbonaceous material burned in step (a).

20. A method in accordance with claim 19 wherein the different carbonaceous material is a liquid carbonaceous material.

21. A method in accordance with claim 15 wherein the thus withdrawn intermediate temperature combustion effluent is between about 150° F. and a temperature substantially below the temperature of the second, high temperature combustion effluent.

22. A method in accordance with claim 21 wherein the thus withdrawn intermediate temperature combustion effluent is at a temperature significantly higher than the predetermined quench temperature and said withdrawn intermediate temperature combustion effluent is cooled to about said predetermined quench temperature prior to introducing the same into the first high temperature combustion effluent.

23. A method in accordance with claim 15 wherein the predetermined quench temperature is about 500° F.

24. A method in accordance with claim 15 wherein the second, high temperature combustion effluent is passed in indirect heat exchange with water to produce steam and the intermediate temperature combustion effluent thus withdrawn is withdrawn downstream of said heat exchange with said water.

25. A method in accordance with claim 15 wherein the second, high temperature combustion effluent is sequentially passed in indirect heat exchange with water, to produce steam and the combustion-supporting gas and the thus withdrawn intermediate temperature combustion effluent is withdrawn between said heat exchange with said water and said heat exchange with said combustion-supporting gas.

26. A method in accordance with claim 15 wherein the high temperature combustion effluent is sequentially passed in indirect heat exchange with the hereinafter-mentioned hot water, to produce steam, the combustion-supporting gas and water to produce said hot water and the thus withdrawn intermediate temperature combustion effluent is withdrawn between said heat exchange with said hot water and said heat exchange with said combustion-supporting gas.

27. A method in accordance with claim 15 wherein the second, high temperature combustion effluent is sequentially passed in indirect heat exchange with the hereinafter-mentioned hot water, to produce steam, the combustion-supporting gas, a carbonaceous material and water, to produce said hot water, and the thus withdrawn intermediate temperature combustion effluent is withdrawn between said heat exchange with said hot water and said heat exchange with said combustion-supporting gas.

* * * * *